(No Model.)

G. VALLEY.
TROLLEY POLE STAND.

No. 513,846. Patented Jan. 30, 1894.

WITNESSES:
J. A. Lynch
R. P. Nash

Gustaf Valley INVENTOR

BY Geo. W. King
ATTORNEY.

UNITED STATES PATENT OFFICE.

GUSTAF VALLEY, OF CLEVELAND, OHIO, ASSIGNOR TO THE STEEL MOTOR COMPANY, OF SAME PLACE.

TROLLEY-POLE STAND.

SPECIFICATION forming part of Letters Patent No. 513,846, dated January 30, 1894.

Application filed May 6, 1893. Serial No. 473,312. (No model.)

*To all whom it may concern:*

Be it known that I, GUSTAF VALLEY, of Cleveland, in the county of Cuyahoga and State of Ohio, have invented certain new and useful Improvements in Trolley-Pole Stands; and I do hereby declare the following to be a full, clear, and exact description of the invention, such as will enable others skilled in the art to which it pertains to make and use the same.

My invention relates to an improved trolley pole stand, and it consists in certain features of construction, and in combination of parts hereinafter described and pointed out in the claims.

Figure 1:
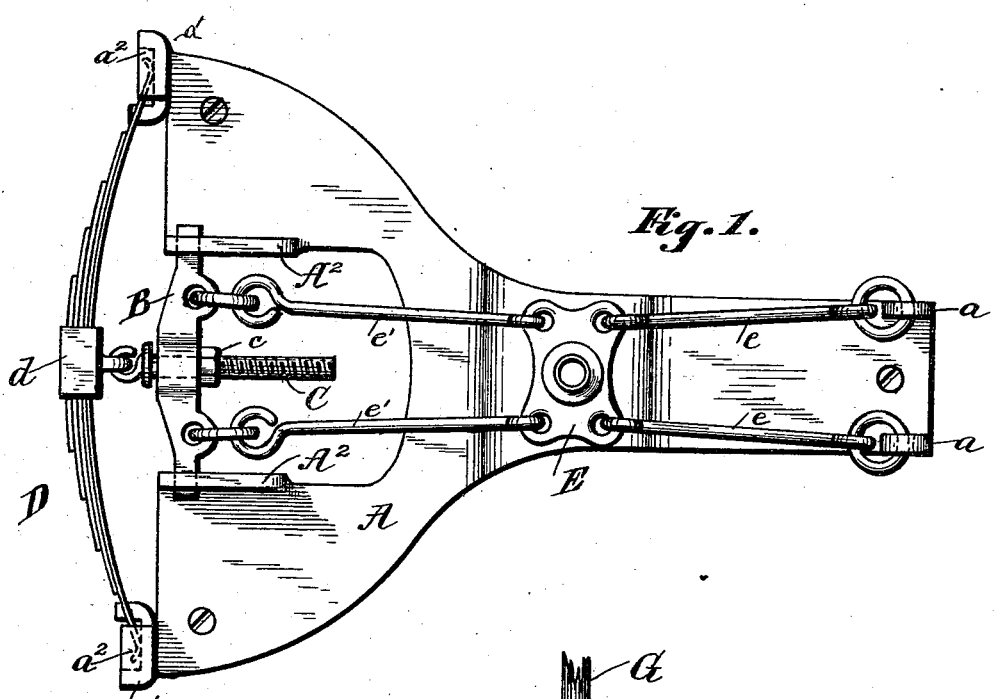
Figure 2:
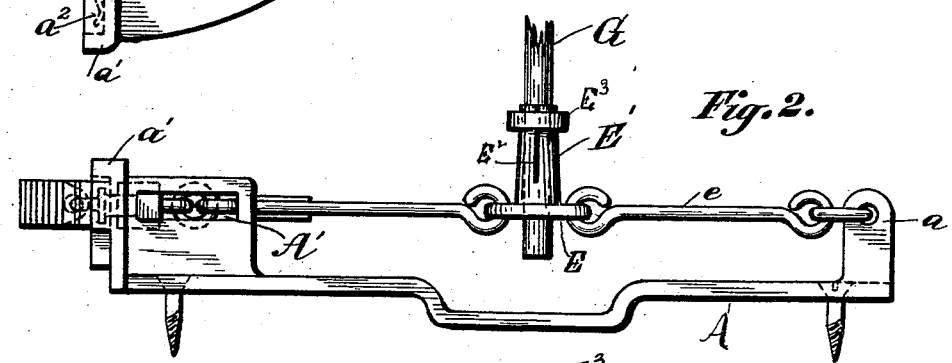
Figure 3:
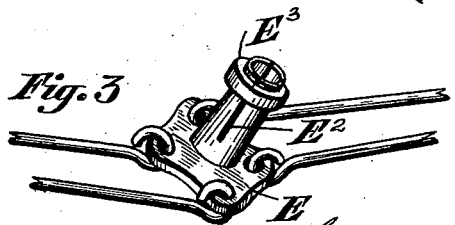

In the accompanying drawings: Figure 1 is a plan of a trolley pole stand embodying my invention. Fig. 2 is a side elevation of the same. Fig. 3 is a view in perspective, showing position of parts with the trolley pole tilted more or less laterally.

A represents a base plate adapted to be secured on top of the car. This plate at the one end thereof has upturned ears $a$, pierced for receiving links $e\ e$. The other end of plate A, has upwardly projecting ears $a'$, the latter having depressions $a^2$, that serve as seats for the ends of the semi-elliptic spring D.

B, is a cross-head that operates in slots $A'$, of flanges $A^2$, these flanges projecting upward from plate A.

E, is the trolley pole plate, the same having a socket $E'$, in which socket the butt of the trolley pole G is secured. The socket $E'$ tapers externally and is slitted at $E^2$, and a compression band $E^3$, is provided, and after the end of the trolley pole has been inserted in the socket, by driving the band down, the upper end of the socket is thereby compressed so as to clamp the trolley pole. The trolley pole plate E, is suspended by means of links $e\ e$, the links $e'\ e'$, engaging the respective corners of the plate. Links $e\ e$, connect with ears $a\ a$, aforesaid. Links $e'\ e'$, connect with cross-head B, aforesaid. Spring D, at the center thereof has a clip $d$, and this clip connects with bolt C, the latter extending with an easy fit through a hole centrally located in the cross-head. Bolt C is provided with a nut $c$, this nut engaging the inner face of the cross-head, and by tightening this nut, tension is given to the spring whereby the links $e\ e'$, are drawn taut, thus holding plate E normally in the position shown in Fig. 2.

With the construction shown, it is evident, that the trolley pole will have an easy universal movement (see Fig. 3) whereby it will follow the over-head wire, even if the wire be not located centrally over the car tracks.

What I claim is—

1. A trolley pole stand comprising a base plate for attaching to the car top, a trolley pole plate, bearing a socket for securing the trolley pole, links engaging the four corners of the trolley pole plate for suspending the same, two of these links engaging fixed members of the base plate, the other links engaging a cross-head, a semi-elliptic spring connected with and acting outward on the cross-head, substantially as and for the purpose set forth.

2. In a trolley pole stand in combination, a trolley pole plate bearing a socket for engaging the trolley pole, such socket being tapering externally, and having a split free end with a compression band engaging the same, such trolley pole plate being suspended by links, a semi-elliptic spring and cross-head for holding the links taut, substantially as and for the purpose set forth.

In testimony whereof I sign this specification, in the presence of two witnesses, this 3d day of May, 1893.

GUSTAF VALLEY.

Witnesses:
G. P. NASH,
D. W. AYLWORTH.